United States Patent [19]
Weilant

[11] Patent Number: 5,845,754
[45] Date of Patent: Dec. 8, 1998

[54] SHIFT SYNCHRONIZER FOR TWO SPEED TRANSFER CASE AND THE LIKE

[75] Inventor: David R. Weilant, Muncie, Ind.

[73] Assignee: Borg-Warner Automotive, Inc., Sterling Heights, Mich.

[21] Appl. No.: 756,199

[22] Filed: Nov. 25, 1996

[51] Int. Cl.⁶ ..................................................... F16D 11/00
[52] U.S. Cl. ....................... 192/53.35; 74/339; 192/87.16
[58] Field of Search ........................ 192/53.342, 53.343, 192/53.35, 87.16; 74/339

[56] References Cited

U.S. PATENT DOCUMENTS

| | | | |
|---|---|---|---|
| 2,747,431 | 5/1956 | Roche | 192/53.35 X |
| 4,271,943 | 6/1981 | Kuzma | 192/53.343 |
| 4,445,602 | 5/1984 | Chana | 192/53.32 |
| 4,573,371 | 3/1986 | Akutagawa | 192/53.343 X |
| 4,625,844 | 12/1986 | Ikemoto et al. | 192/53 |
| 4,732,247 | 3/1988 | Frost | 192/53 |
| 4,770,280 | 9/1988 | Frost | 192/53 |
| 4,869,353 | 9/1989 | Ohtsuki et al. | 192/53 |
| 4,875,566 | 10/1989 | Inui et al. | 192/53 |
| 5,036,719 | 8/1991 | Razzacki | 74/339 |
| 5,054,595 | 10/1991 | Lutz et al. | 192/53 |
| 5,343,993 | 9/1994 | Soffa | 192/53 |
| 5,346,442 | 9/1994 | Eastman | 475/223 |
| 5,390,347 | 2/1995 | Buri et al. | 475/303 |

*Primary Examiner*—Charles A. Marmor
*Assistant Examiner*—Saúl J. Rodriguez
*Attorney, Agent, or Firm*—Brinks, Hofer, Gilson & Lione; Greg Dziegielewski

[57] ABSTRACT

A shift synchronizer for a motor vehicle transfer case includes a pair of blocker rings disposed on opposite sides of a plurality of circumferentially arrayed struts. The blocker rings include respective symmetrically disposed cone clutch faces. The clutch faces abut complementarily configured surfaces on the input shaft and the planet carrier of a planetary gear speed reduction assembly. The struts are spring biased radially inwardly by circumferentially extending tension springs and are received upon and detentingly engage a shift sleeve. The shift sleeve is splined to the transfer case output shaft. As the shift sleeve is translated axially toward either the input shaft or the planet carrier, the cone clutch face of the respective blocker ring is urged into contact with its adjacent complementarily configured clutch surface thereby frictionally engaging the output shaft with the input shaft or the planet carrier thereby causing such components to achieve synchronism.

22 Claims, 4 Drawing Sheets

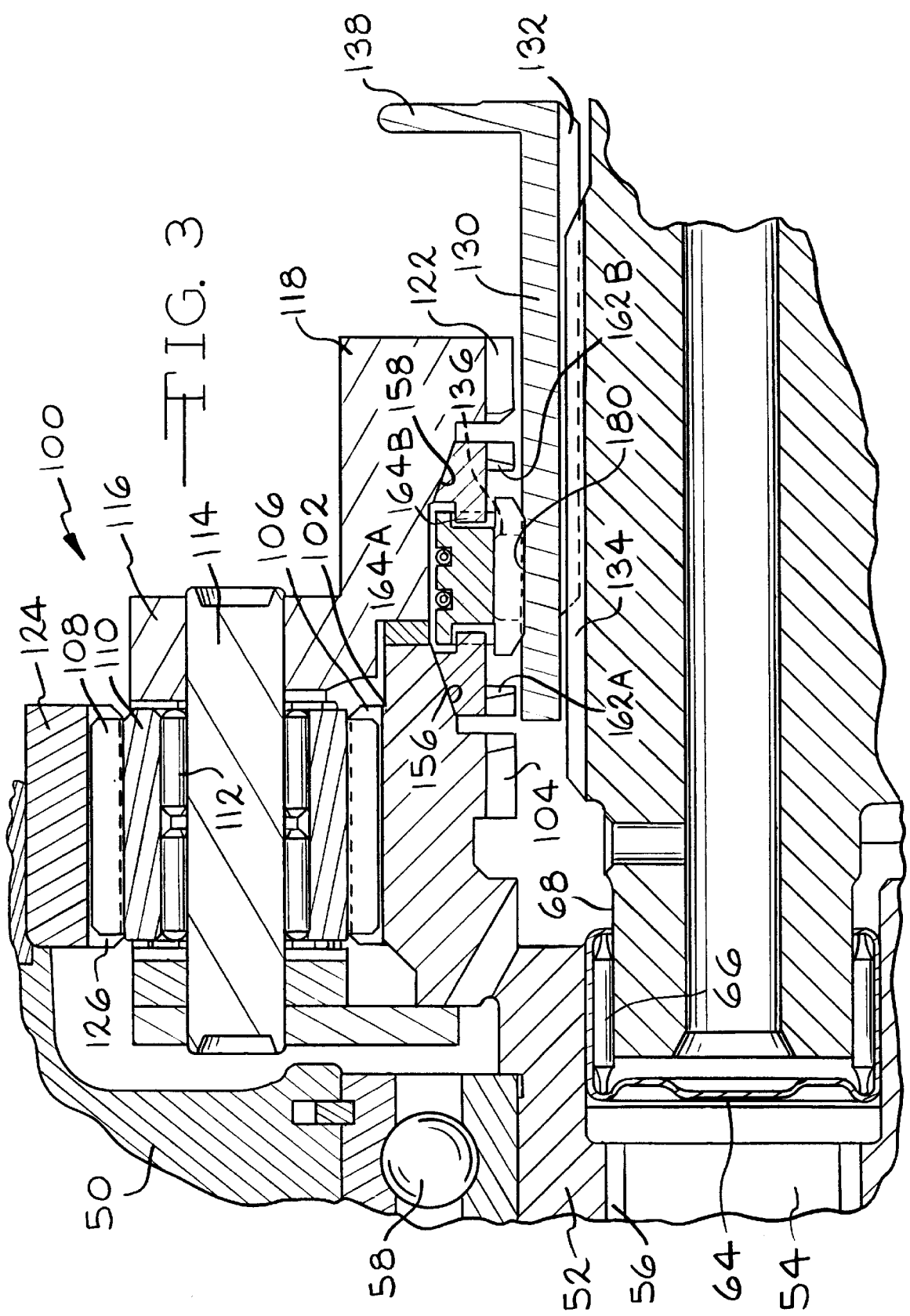

SHIFT SYNCHRONIZER FOR TWO SPEED TRANSFER CASE AND THE LIKE

BACKGROUND OF THE INVENTION

The invention relates generally to synchronizing devices for use in motor vehicle drive lines and more specifically to a shift synchronizer for use in a two speed motor vehicle transfer case.

In the motor vehicle art, the invention of speed change gearing for a vehicle transmission was followed first with the desire to achieve preshift gear synchronization and soon by devices which achieved, with varying degrees of success, the desired synchronization. Synchronizers are also utilized in two-speed motor vehicle transfer cases wherein shifts between a high or direct drive speed range to a low gear or reduced speed range are operator selected, preferably while the vehicle is in motion.

The volume of gear synchronizer art is extensive and representative of the high level of sophistication of such devices. For example, U.S. Pat. No. 4,625,844 utilizes a pair of symmetrically arranged synchronizer rings and an associated pair of resilient members which are disposed in opposed relationship on opposite sides of a bi-directionally translatable clutch sleeve. U.S. Pat. No. 4,869,353 also teaches a device having a pair of symmetrical, opposed clutch members on opposite sides of a detented shift member.

U.S. Pat. No. 4,875,566 teaches a gear synchronizer which also utilizes mirror image symmetry of the synchronizing components. Here, the synchronizing clutches engage and operate in conjunction with the clutch sleeve and are splined to the members they synchronize. U.S. Pat. No. 5,036,719 also includes a detented shift collar which engages synchronizing blocker rings formed of a resilient composite material.

U.S. Pat. No. 5,343,993 teaches a spring and ball detented synchronizer, symmetrically disposed annular clutch rings having conical clutch surfaces and coupling tabs. U.S. Pat. No. 5,390,347 teaches a transmission synchronizer including a single piece synchronizer ring having a symmetrical, conical surface.

From the foregoing, it is apparent that significant attention has been directed to the development and improvement of two speed synchronizing devices. It is also apparent that improvements in this art are both desirable and possible.

SUMMARY OF THE INVENTION

A shift synchronizer for a motor vehicle transfer case includes a pair of blocker rings disposed on opposite sides of a plurality of circumferentially arrayed struts. The blocker rings include respective symmetrically disposed cone clutch faces. The clutch faces abut complementarily configured surfaces on the input shaft and the planet carrier of a planetary gear speed reduction assembly. The struts are spring biased radially inwardly by circumferentially extending tension springs and are received upon and detentingly engage a shift sleeve. The shift sleeve is splined to the transfer case output shaft. As the shift sleeve is translated axially toward either the input shaft or the planet carrier, the cone clutch face of the respective blocker ring is urged into contact with its adjacent complementarily configured clutch surface thereby frictionally engaging the output shaft with the input shaft or the planet carrier thereby causing such components to achieve synchronism.

Thus it is an object of the present invention to provide a two speed synchronizer having a plurality of spring biased struts detented upon a shift sleeve.

It is a further object of the present invention to provide a two speed synchronizer having a plurality of circumferentially arrayed spring biased struts.

It is a still further object of the present invention to provide a two speed synchronizer for providing on the fly high to low synchronized shifts.

It is a still further object of the present invention to provide a two speed synchronizer having a pair of symmetrically disposed blocker rings positioned by a plurality of circumferentially arrayed struts.

Further objects and advantages of the present invention will become apparent by reference to the following description of the preferred and alternate embodiments wherein like reference numbers refer to the same component, element or feature.

BRIEF DESCRIPTION OF THE DRAWINGS

FIG. 3 is an enlarged, fragmentary, sectional view of a portion of planetary gear speed reducing assembly and a shift synchronizer according to the present invention;

FIG. 4 is an exploded, perspective view of a shift synchronizer according to the present invention;

DESCRIPTION OF THE PREFERRED AND ALTERNATE EMBODIMENTS

Figure 1:
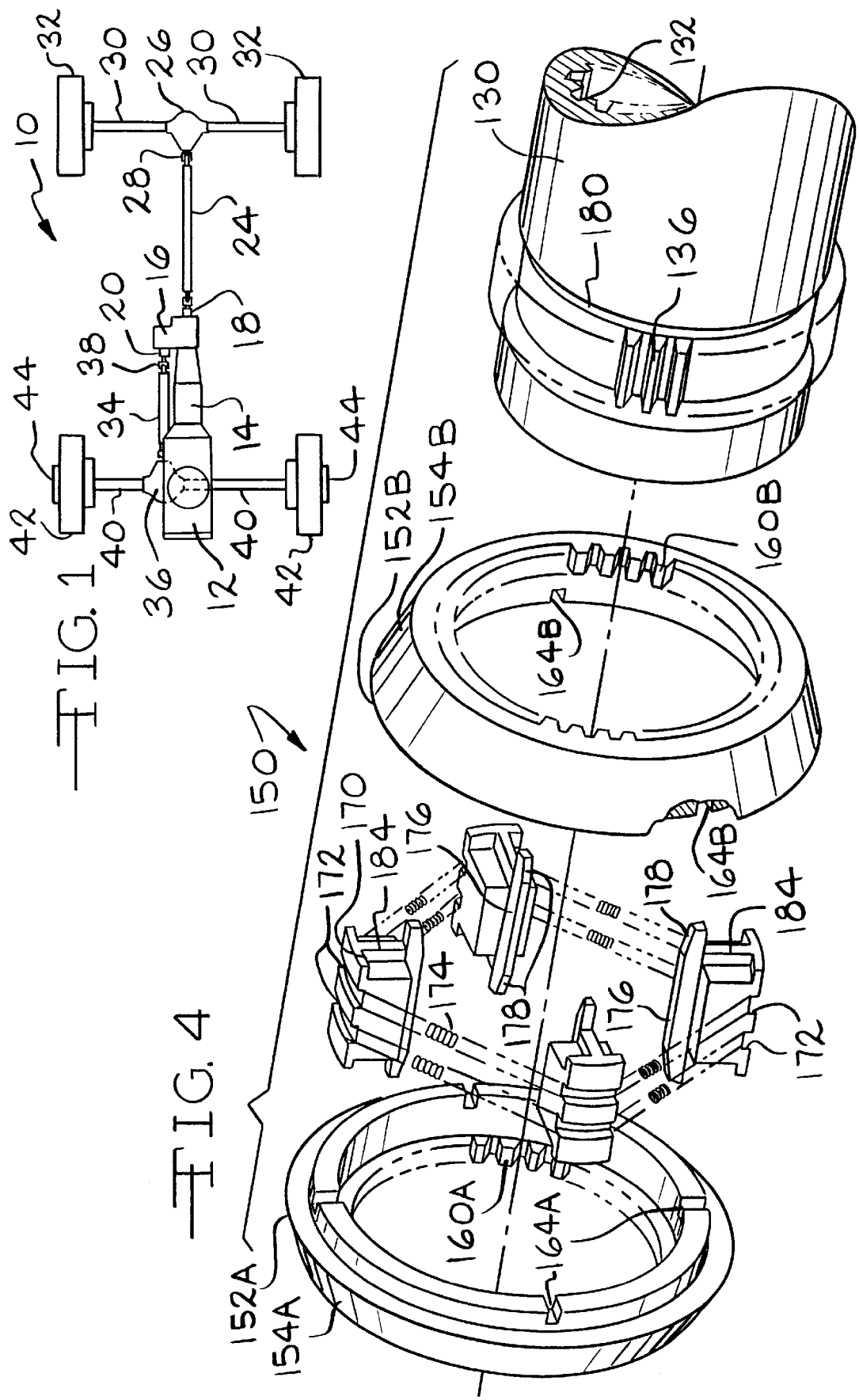
FIG. 1 is a diagrammatic, plan view of a motor vehicle drive train having a transfer case incorporating the present invention.

Referring now to FIG. 1, a vehicle drive system incorporating the present invention is illustrated and generally designated by the reference numeral 10. The vehicle drive system 10 includes a prime mover such as an internal combustion engine 12 having an output which is operably coupled to a transmission 14. The transmission 14, in turn, has an output which is operably coupled to a transfer case assembly 16 according to the instant invention. The transfer case assembly 16 includes a main or primary, rear output shaft 18 and a secondary, front output shaft 20. The primary output shaft 18 of the transfer case assembly 16 drives a rear drive shaft 24 which delivers power to a rear differential 26. Universal joints 28 are utilized as necessary and in accordance with conventional practice to couple the rear drive shaft 24 to the primary output shaft 18 and the rear differential 26. The output of the rear differential 26 is coupled through rear drive axles 30 to a pair of rear tire and wheel assemblies 32. In the rear wheel drive arrangement illustrated, the rear drive shaft 24, the rear differential 26, the universal joints 28, the rear drive axles 30 and the rear tire and wheel assemblies 32 constitute a primary (full-time) driveline.

Similarly, the front or secondary output shaft 20 of the transfer case assembly 16 drives a front drive shaft 34 which delivers power to a front differential 36. Again, appropriate universal joints 38 are utilized as necessary in accordance with conventional practice to couple the secondary output shaft 20 to the front drive shaft 34 and the front differential 36. The front differential 36 delivers power through a pair of front axles 40 to a pair of front tire and wheel assemblies 42. Preferably, a respective pair of locking hubs 44 selectively couple the front axles 40 to a respective one of the tire and wheel assemblies 42. The locking hubs 44 may be either manually or remotely and automatically activated. In the rear wheel drive arrangement illustrated, the front drive shaft 34, the front differential 36, the universal joints 38, the front drive axles 40, the front tire and wheel assemblies 42 and the locking hubs 44 constitute a secondary (part-time) driveline.

Figure 2:
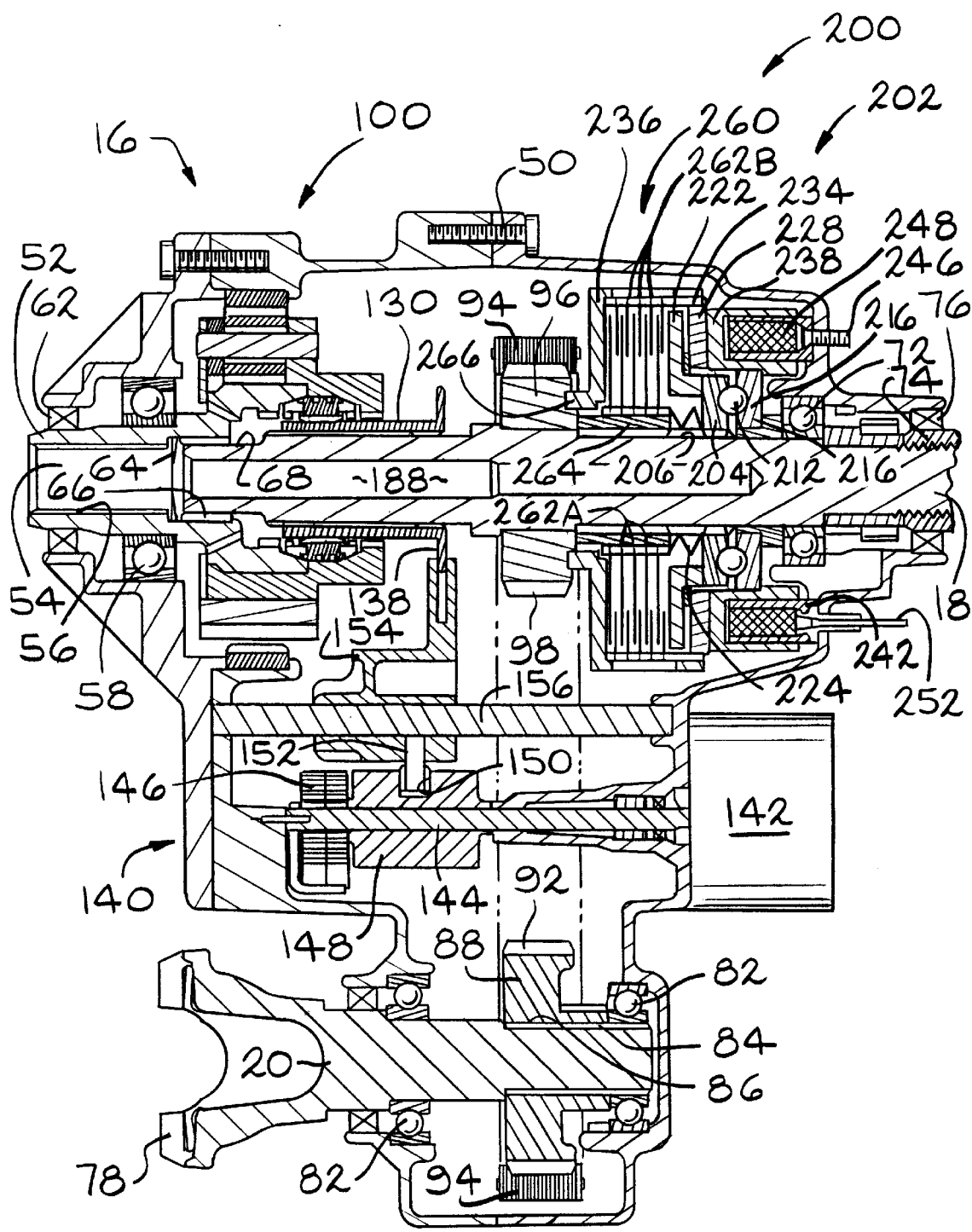
FIG. 2 is full, sectional view of two speed motor vehicle transfer case incorporating a shift synchronizer according to the present invention.

Referring now to FIG. 2, the transfer case assembly 16 includes a multiple part, typically cast, housing 50 having various openings for shafts and fasteners and various mounting surfaces and grooves for shaft seals, bearings, seal retaining grooves and other internal components as will be readily appreciated from inspection of FIGS. 2 and 3. The housing 50 receives a stub input shaft 52 defining a through, stepped bore 54 having a region of first diameter defining a plurality of female splines or gear teeth 56 or other suitable structures for engaging and drivingly receiving a complementarily configured output shaft (not illustrated) of the transmission 14 illustrated in FIG. 1. The input shaft 52 is partially supported upon an anti-friction bearing such as the ball bearing assembly 58. A shaft seal 62 surrounds the input shaft 52 at the forward end of the housing 50. A larger diameter region of the stepped bore 54 of the input shaft 52 receives a cup shaped shaft seal 64 and a roller bearing 66. The roller bearing assembly 66, in turn, receives and rotatably supports a reduced diameter region 68 of the first or primary output shaft 18. The opposite end of the primary output shaft 18 is rotatably supported in an anti-friction bearing such as a ball bearing assembly 72. The end of the primary output shaft 18 preferably includes male threads 74 and may receive a complementarily threaded flange (partially illustrated) which may be secured to associated driveline elements illustrated in FIG. 1. A shaft seal 76 provides an appropriate seal between the threaded flange and the housing 50.

The housing 50 of the transfer case assembly 16 also receives a second or secondary output shaft 20 which may be integrally formed with or include a fitting or coupling 78 which forms a portion of a universal joint 38 or similar driveline component. The secondary output shaft 20 is supported by a pair of anti-friction bearings such as the ball bearing assemblies 82. The secondary output shaft 20 includes a region of male splines 84. The male splines 84 receive and rotatably engage complementarily configured female splines 86 disposed on the inner surface of a driven chain sprocket 88 having chain teeth 92. A drive chain 94 extends around and is received upon a chain drive sprocket 96 having chain teeth 98. The chain drive sprocket is freely rotatably disposed upon the output shaft 18.

Referring now to FIGS. 2 and 3, the transfer case assembly 16 incorporates a planetary gear speed reduction assembly 100. The planetary gear speed reduction assembly 100 includes a centrally disposed sun gear 102 which is preferably integrally formed on and rotates with the input shaft 52. Also formed in the input shaft 52 and disposed radially inwardly from the sun gear 102 is a set of female splines or gear teeth 104 preferably having chamfered ends. The sun gear 102 includes gear teeth 106 disposed about its periphery which drivingly engage complementarily gear teeth 108 formed on a plurality of planet or pinion gears 110, one of which is illustrated in both FIGS. 2 and 3. The planet gears 110 receive and are supported upon anti-friction bearings such as roller bearing assemblies 112 which, in turn, are supported on stub shafts 114 which are mounted and retained within a planet carrier 116. The planet carrier 116 includes an axial extension 118 having a plurality of female splines or gear teeth 122 which are configured identically to the female splines or gear teeth 104 on the interior of the input shaft 52 and preferably also include chamfered ends. A ring gear 124 having gear teeth 126 complementary to the gear teeth 108 of the planet gears 110 is fixedly secured within the housing 50 in operating alignment with the planet gears 110.

A sliding shift sleeve or reduction hub 130 is concentrically disposed about the primary output shaft 18 and includes female splines or gear teeth 132 which are in constant mesh and driving engagement with complementary male splines or gear teeth 134 disposed on the exterior of the primary output shaft 18. The shift sleeve 130 also includes a set of male splines or gear teeth 136 proximate one end which are complementary to the female splines or gear teeth 104 and 122 on the input shaft 52 and the extension 118 of the planet carrier 116, respectively. A radially outwardly directed flange 138 is disposed on the end of the shift sleeve 130 opposite the splines or gear teeth 136.

Axial translation of the shift sleeve 130 may thus be undertaken to selectively couple and directly drive the primary output shaft 18 from the input shaft 52 (high gear) when the shift sleeve 130 is in a position to the left of that illustrated in FIGS. 2 and 3 such that the splines or gear teeth 104 and 136 are engaged. When the shift sleeve 130 is in a position to the right of that illustrated in FIGS. 2 and 3, such that the splines or gear teeth 122 and 136 are engaged, the primary output shaft 18 is driven by the carrier 116 of the planetary gear speed reduction assembly 100 at a reduced speed (low gear) established by the gear ratio of the planetary gear assembly 100. When the shift sleeve 130 is in the position illustrated in FIGS. 2 and 3, there is no driving connection between the input shaft 52 and the primary output shaft 18 and the transfer case assembly 16 is in neutral.

Selective axial translation of the shift sleeve 130 and thus selection of either direct drive (high gear), reduced speed drive through the planetary gear assembly 100 (low gear) or neutral is achieved by an actuator assembly 140. The actuator assembly 140 includes an electric, pneumatic or hydraulic drive motor 142 which rotates a shaft 144. The shaft 144 drives an energy storing flat coil spring 146 which, in turn, drives a cam assembly 148 having a cam pathway 150. A cam follower pin 152 seats within the cam pathway 150 in the cam assembly 148 and, as the shaft 144 and the cam 148 rotate, the follower pin 152 bi-directionally translates a shift fork 154 along a cylindrical bearing 156. The shift fork 154, in turn, engages the flange 138 on the shift sleeve 130. As noted, the flat coil spring 146 provides a resilient, energy storing interconnection between the drive motor 142 and the shift fork 154 whereby the shift motor 142 may reach a desired position but the shift fork 154 and shift sleeve 130 may not move into a corresponding desired position until forces acting upon the shift sleeve 130 have lessened to a point where energy stored in the spring 146 will complete the shift commanded by the drive motor 142.

Referring now to FIGS. 3 and 4, a high-low synchronizer assembly 150 according to the present invention includes a pair of identical and symmetrically disposed blocker or synchronizing rings 152A and 152B. The blocker or synchronizer rings 152A and 152B each include frusto-conical clutch faces 154A and 154B. The clutch faces 154A and 154B may be treated or hardened metal, may include an appropriate facing or friction material and may also include one or more helical (spiral) lubricating grooves.

The frusto-conical clutch face 154A aligns with and abuts a complementarily configured frusto-conical clutch surface 156 formed adjacent the end of the input shaft 52 and the frusto-conical clutch face 154B is aligned with and abuts a complementarily configured frusto-conical clutch surface 158 on the extension 118 of the planet carrier 116. Each of the blocker or synchronizing rings 152A and 152B includes identically configured male splines or gear teeth 160A and 160B which preferably include chamfers 162A and 162B adjacent the inwardly directed end faces of the gear teeth or splines 160A and 160B. Finally, the synchronizing rings 152A and 152B each define a respective plurality of radially oriented kerfs or slots 164A and 164B.

The radially oriented kerfs or slots 164A and 164B receive a plurality of struts 170. Preferably at least three struts 170 are utilized and are disposed at equal circumferential, therefore, 120° intervals. Four, five six, eight or more struts disposed at equal circumferential intervals may be utilized if desired. The struts 170 are identical and each include a pair of parallel arcuate grooves 172 on its outer surface which receive a pair of circumferentially disposed garter or tension springs 174. The tension springs 174 bias the struts 170 radially inwardly toward the shift sleeve or reduction hub 130. The struts 170 include axially oriented shoes 176 having chamfered ends 178. The shoes 176 are received within complementarily configured axial recesses 180 formed in the shift sleeve 130. The preload or bias provided by the tension springs 174 cooperates with the chamfered ends 178 of the shoes 176 and axial recesses 180 to achieve detenting of the struts 170 within the axial recesses of the shift sleeve 130.

The struts 170 also include radially oriented ribs 184 which are complementary to and engaged by the kerfs or slots 164A and 164B in the respective blocker rings 152A and 152B. Preferably, the recesses 180 straddle, i.e., are axially medially disposed relative to, the clutch teeth 136. It will be appreciated that the synchronizing or blocker rings 152A and 152B and the struts 174 rotate in unison. Furthermore, when the shift sleeve 130 is in the position illustrated in FIGS. 2 and 3, such that the gear teeth 136 engage the struts 170, the synchronizer rings 152A and 152B, the struts 170 and the shift sleeve 130 all rotate in unison.

A gerotor pump (not illustrated) may be disposed about the primary output shaft 18 to provide a pressurized flow of cooling lubricant to an axial bore 188 concentrically disposed within the primary output shaft 18. The bore 188 communicates with a plurality of radial ports (one of which is illustrated in FIG. 3) which distribute the cooling lubricant to various components within the transfer case assembly 16 according to conventional practice.

Referring again to FIG. 2, the transfer case assembly 16 also includes electromagnetically actuated disc pack assembly 200. The disc pack assembly 200 is disposed about the output shaft 18 and includes operator or actuator assembly 202 having a circular drive member 204 rotationally coupled to the output shaft 18 through a set of female splines or gear teeth which engage a complementary set of splines or gear teeth 206 on the output shaft 18. One face of the circular drive member 204 includes a plurality of circumferentially spaced apart recesses in the shape of an oblique section of a helical torus. Each of the plurality of recesses receives one of a like plurality of load transferring balls 212.

A circular driven member 216 disposed adjacent the circular drive member 204 includes a like plurality of recesses on an opposing face which define the same shape as the recesses in the drive member 204. The oblique sidewalls of the recesses function as ramps or cams and cooperate with the balls 212 to drive the circular members 204 and 216 axially apart in response to relative rotation therebetween. It will be appreciated that the recesses and the load transferring balls 212 may be replaced with other analogous mechanical elements which cause axial displacement of the circular members 204 and 216 in response to relative rotation therebetween. For example, tapered rollers disposed in complementarily configured conical helices may be utilized.

The circular drive member 204 is secured to or integrally formed with a radially outwardly extending apply plate 222. A compression spring 224 is concentrically disposed about the output shaft 18. The compression spring 224 may include a plurality of Belleville springs or wave washers. The compression spring 224 provides a biasing or restoring force to the circular drive member 204 and the apply plate 222 urging them to the right as illustrated in FIG. 2. Behind, i.e., to the right of the apply plate 222, and generally aligned therewith is a clutch armature 228. The clutch armature 228 includes a plurality of male splines or gear teeth disposed about its periphery which engage a complementary plurality of female splines or gear teeth 234 which extend axially along the inner surface of a cylindrical portion of a bell shaped clutch housing 236.

Positioned adjacent the face of the clutch armature 228 opposite the apply plate 222 is a soft iron rotor 238. The rotor 238 is freely rotatably received upon a complementarily configured stationary coil housing 242. The rotor 238 is coupled to and rotates with the circular driven member 216 by virtue of a splined interconnection or other securement such as a friction fit or weldments. The coil housing 242 is secured to the housing 50 of the transfer case assembly 16 by a plurality of suitable fasteners 246, one of which is illustrated in FIG. 2. The coil housing 242 receives an electromagnetic coil 248 which is connected to a source of electrical energy through a conductor 252.

Adjacent the apply plate 222 and contained within the clutch housing 236 is a disc pack assembly 260. The disc pack assembly 260 includes a plurality of interleaved friction plates or discs 262. A first plurality of smaller diameter discs 262A are received upon the male splines of a splined collar 264 which in turn seats upon the male splines 206 of the output shaft 18. The first plurality of friction discs 262A and the splined collar 264 thus all rotate with the primary output shaft 18. A second plurality of larger diameter discs 262B are interleaved with the first plurality of discs 262A and include splines about their peripheries which engage the splines or gear teeth 234 on the inner surface of the cylindrical portion of the clutch housing 236 and rotate therewith. The clutch housing 236 is concentrically disposed about the primary output shaft 18 and includes a plurality of lugs or projections 266 which are received within complementarily configured openings or apertures in the chain drive sprocket 96. The chain drive sprocket 96, is, as noted, freely rotatably disposed about the primary output shaft 18 and includes chain drive teeth 98 about its periphery which engage the drive chain 94. The drive chain 94 transfers power to the driven sprocket 88 coupled to the secondary output shaft 20.

It will be appreciated that energization of the electromagnetic coil 248 creates a magnetic flux which produces drag and thence relative rotation between the circular drive member 204 and the circular driven member 216 thereby driving them apart. As the circular members 204 and 216 separate, a compressive force is applied through the apply plate 222 to the disc pack assembly 260. Compression of the friction discs 262A and 262B results in torque transfer from the primary output shaft 18 to the chain drive sprocket 96, the drive chain 94, the driven chain sprocket 88 and the secondary output shaft 20. The magnitude of torque transfer from the primary output shaft 18 to the secondary output shaft 20 from no torque transfer to 50 percent torque transfer, that is, an equal split of torque between the two output shafts 18 and 20, can be controlled by adjusting the magnitude of electrical energy provided to the electromagnetic coil 248. Further details of the structure and operation of the disc pack assembly 200 may be found in co-owned U.S. Pat. No. 5,407,024 granted Apr. 18, 1995 which is hereby incorporated by reference.

Figures 5, 6:
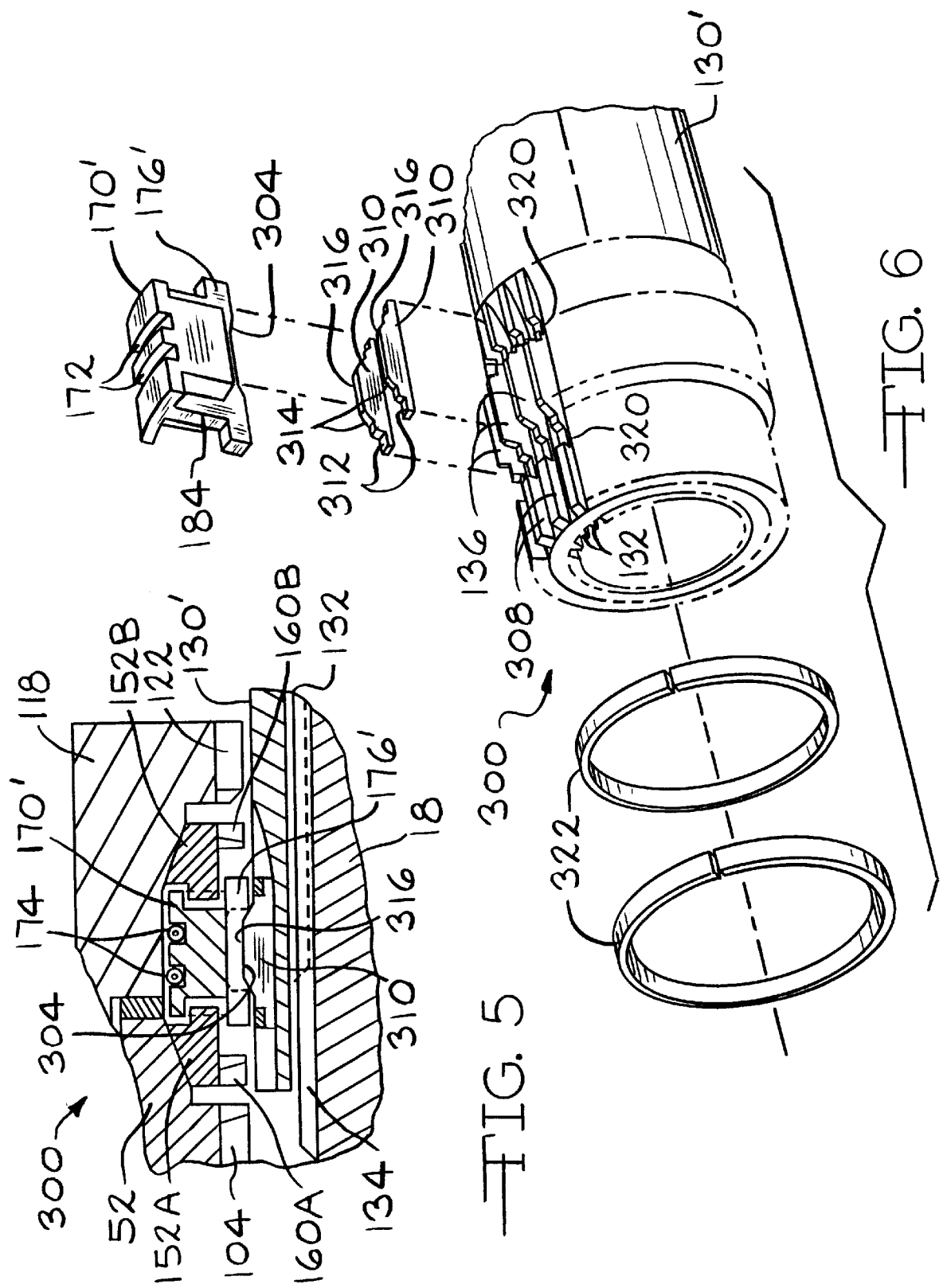
FIG. 5 is an enlarged, fragmentary, sectional view of a portion of a shift synchronizer according to the present invention having an alternate embodiment shift sleeve detent assembly.
FIG. 6 is an exploded, perspective view of the alternate embodiment shift sleeve detent assembly according to the present invention.

Referring now to FIGS. 5 and 6, a first alternate embodiment synchronizer assembly is illustrated and generally designated by the reference number 300. The alternate embodiment synchronizer assembly 300 includes substantially the same components as the preferred embodiment synchronizer assembly 150 but includes a distinct detent mechanism. Thus, the alternate embodiment synchronizer assembly 300 includes the blocker rings 152A and 152B which cooperate with the input shaft 52 and the extension 118 of the planetary gear carrier 116 and the respective gear teeth 160A and 160B. A plurality of alternate embodiment struts 170' are disposed at equal circumferential intervals about the blocker rings 152A and 152B and include the pair of retaining springs 174 disposed in the pair of slots 172. The alternate embodiment struts 170' each include an axially oriented shoe 176' having a recess 304 medially, axially disposed therein.

The shift sleeve or reduction hub 130' is also similar in that it also includes the internal splines or gear teeth 132 and a similar set of male splines or gear teeth 136. However, the shift sleeve 130 also includes a plurality of axially extending slots or channels 308 which are formed in the periphery of the shift sleeve 130' between each of the male splines or gear teeth 136. Disposed in each of the plurality of axial slots 308 is a detent insert 310. The detent inserts 310 include a pair of spaced apart end regions or flats 312, a pair of obliquely disposed camming or detenting surfaces 314 and a centrally disposed flat or land 316.

On both sides of the male splines or gear teeth 136 on the shift sleeve 130' are disposed circumferential slots or grooves 320 which are cut into the material remaining in the shift sleeve 130' between the axially extending slots 308. The detent inserts 310 are retained within the shift sleeve 130' by a pair of snap rings 322 which seat within the circumferential grooves or slots 320 and engage the flats 312 on each end of the detent inserts 310 thereby maintaining them in the position illustrated in FIG. 5. It will be appreciated that the land 316 and the oblique, camming surfaces 314 on each end of the detent inserts 310 cooperates with the recesses 304 on each of the alternate embodiment struts 170' to provide a detenting action between the struts 170' and the shift sleeve 130'.

The operation of the shift synchronizer assembly 150 will now be described, particularly with reference to FIGS. 2, 3, and 4. It should be understood that operation of the alternate embodiment shift synchronizer assembly 300 is, in all significant respect, the same. Initially, it will be assumed that the shift sleeve 130 is in the neutral position as illustrated in FIGS. 2 and 3. When a shift is commanded, the drive motor 142 commences motion which causes the shift fork 154 and thence the shift sleeve 130 to move either to the left to engage the gear teeth or splines 104 on the input shaft 52 to achieve high or direct drive or to the right to engage the gear teeth 122 on the extension 118 of the planetary gear carrier 116 to engage low or reduced speed drive. With either the preferred or alternate embodiment detenting mechanism, the struts 170 or 170' remain on the shift sleeve 130 as it moves and begins to translate one of the blocker rings 152A or 152B and its associated frusto-conical surface 154A or 154B against the complementary frusto-conical surface 156 or 158 thereby beginning to synchronize the speeds of the input shaft 52 or planetary carrier 116 with the output shaft 18.

When sufficient motion of the shift sleeve 130 has occurred, the detenting force achieved by the recesses 180 or the oblique surfaces 314 is overcome and the gear teeth 136 engage either the teeth 160A or 160B on the respective blocker rings 152A and 152B. Because the blocker rings 152A and 152B are always coupled to the shift sleeve 130 either through the struts 170 or 170' and the gear teeth 136 or directly by the gear teeth 136 with the teeth 160A or 160B, engagement of the frusto-conical surfaces 154A or 154B with the surface 156 on the input shaft 52 or the surface 158 on the extension 118 of the planetary carrier 116 continues to drive the elements into synchronism. As the shift sleeve 130 continues to move and substantial synchronism is achieved, the male gear teeth or splines 136 engage either the female gear teeth or splines 104 on the input shaft 52 or the gear teeth or splines 122 on the extension 118 of the planetary gear carrier 116, thereby directly coupling one of these two drive members to the output shaft 18.

The foregoing disclosure is the best mode devised by the inventor for practicing this invention. It is apparent, however, that apparatus incorporating modifications and variations will be obvious to one skilled in the art of synchronizers. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A synchronizer adapted for use between two drive members and an output member comprising, in combination, a first drive member having a frusto-conical friction surface and first female gear teeth, a second drive member having a second frusto-conical friction surface and second female gear teeth, a shift sleeve rotationally coupled to said output member and axially slidable thereupon, said shift sleeve including male gear teeth disposed thereabout, a pair of blocker rings each having a frusto-conical friction surface, one of said frusto-conical surfaces of said pair of blocker rings disposed adjacent a respective one of said frusto-conical friction surfaces of said first member and said second member, a plurality of struts disposed about said shift sleeve and between said pair of blocker rings, said struts including a groove, a tensioning spring disposed in said groove and extending about said struts and a detent structure cooperating with a complementary detent structure on said shift sleeve.

2. The synchronizer of claim 1 wherein said detent structure includes a plurality of axial recesses in said shift sleeve and projections complementary to said recesses formed on said struts.

3. The synchronizer of claim 1 wherein said detent structure includes recesses formed in said struts and projections complementary to said recesses on said shift sleeve.

4. The synchronizer of claim 3 wherein said projections are formed on inserts and said shift sleeve includes axial slots disposed between said male gear teeth of said shift sleeve and said axial slots receive said inserts.

5. The synchronizer of claim 4 wherein said shift sleeve further includes a pair of circumferential channels adjacent said male gear teeth and a pair of snap rings disposed within said circumferential channels for retaining said inserts.

6. The synchronizer of claim 1 wherein said tensioning spring is a garter spring.

7. The synchronizer of claim 1 wherein said blocker rings include radial slots and said struts include ribs which are received within said radial slots.

8. The synchronizer of claim 1 wherein said pair of blocker rings each include a set of female gear teeth selectively engageable by said male gear teeth on said shift sleeve.

9. The synchronizer of claim 8 wherein said female gear teeth on said blocker rings include chamfers.

10. A synchronizer adapted for use between two drive members rotatable at distinct speeds and an output member comprising, in combination,
 a first drive member having a friction surface and first gear teeth,
 a second drive member having a second clutch surface and second gear teeth,
 a shift sleeve rotationally coupled to said output member and axially slidable thereupon, said shift sleeve including male gear teeth disposed thereabout,
 a pair of blocker rings each having a friction surface, one of said surfaces of said pair of blocker rings disposed adjacent a respective one of said friction surfaces of said first member and said second member,
 a plurality of struts disposed between said pair of blocker rings and about said shift sleeve, said struts including a peripheral groove and a tensioning spring disposed in said groove and extending about said struts, and
 a detent structure operably disposed between said struts and said shift sleeve.

11. The synchronizer of claim 10 wherein said tensioning spring is a pair of garter springs and said struts include a pair of grooves for receiving said tensioning springs.

12. The synchronizer of claim 10 wherein said detent structure includes a plurality of axial recesses in said shift sleeve and projections complementary to said recesses formed on said struts.

13. The synchronizer of claim 10 wherein said detent structure includes recesses formed in said struts and projections complementary to said recesses on said shift sleeve.

14. The synchronizer of claim 10 wherein said blocker rings include radial slots and said struts include ribs which are received within said radial slots.

15. The synchronizer of claim 10 wherein said pair of blocker rings each include a set of female gear teeth selectively engageable by said male gear teeth on said shift sleeve.

16. A transfer case synchronizer adapted for use between a first drive member, a second drive member and an output member comprising, in combination,
 a first, direct drive member having a friction surface and first gear teeth,
 a second, reduced speed drive member having a second friction surface and second gear teeth,
 a shift sleeve rotationally coupled to said output member and axially slidable thereupon, said shift sleeve including gear teeth disposed thereabout,
 a pair of blocker rings each having a friction surface, one of said friction surfaces of said pair of blocker rings disposed adjacent a respective one of said friction surfaces of said first member and said second member,
 a plurality of struts disposed about said shift sleeve and between said pair of blocker rings, said struts including a groove and a tensioning spring disposed in said groove and extending about said struts, and
 cooperating detent structures disposed on said shift sleeve and said struts
 whereby said gear teeth of said shift sleeve are engageable with either said first gear teeth to provide direct drive to said output member or said second gear teeth to provide reduced speed drive to said output member.

17. The transfer case synchronizer of claim 16 wherein said detent structures include projections formed on said shift sleeve or said struts and recesses formed in said struts or said shift sleeve.

18. The transfer case synchronizer of claim 16 wherein said blocker rings include female gear teeth complementary to said gear teeth on said shift sleeve.

19. The transfer case synchronizer of claim 18 wherein said female gear teeth, said first gear teeth and said second gear teeth include chamfers.

20. The transfer case synchronizer of claim 16 wherein said blocker rings include radial slots and said struts include ribs which are received within said radial slots.

21. The transfer case synchronizer of claim 16 further including an actuator mechanism for axially, bi-directionally translating said shift sleeve.

22. The transfer case synchronizer of claim 16 wherein said friction surfaces are frusto-conical.

* * * * *